United States Patent
Stefan

(10) Patent No.: US 9,835,465 B2
(45) Date of Patent: Dec. 5, 2017

(54) METHOD FOR OPERATING AN AUTONOMOUS VEHICLE ON A COURIER ROUTE

(71) Applicant: FORD GLOBAL TECHNOLOGIES, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/072,062

(22) Filed: Mar. 16, 2016

(65) Prior Publication Data

US 2016/0273922 A1    Sep. 22, 2016

(30) Foreign Application Priority Data

Mar. 19, 2015   (DE) ........................ 10 2015 204 947

(51) Int. Cl.
| | |
|---|---|
| *G01C 22/00* | (2006.01) |
| *G01C 21/34* | (2006.01) |
| *G06Q 10/00* | (2012.01) |
| *G08G 1/00* | (2006.01) |

(52) U.S. Cl.
CPC ....... *G01C 21/3407* (2013.01); *G01C 21/343* (2013.01); *G06Q 10/00* (2013.01); *G08G 1/00* (2013.01)

(58) Field of Classification Search
USPC ....................................................... 701/23
See application file for complete search history.

(56) References Cited

U.S. PATENT DOCUMENTS

| | | | |
|---|---|---|---|
| 9,373,149 B2* | 6/2016 | Abhyanker | ............ G06Q 50/28 |
| 2013/0317944 A1* | 11/2013 | Huang | .................. G01S 5/0252 |
| | | | 705/26.61 |
| 2014/0136414 A1 | 5/2014 | Abhyanker | |
| 2014/0277900 A1* | 9/2014 | Abhyanker | ............ G01C 21/32 |
| | | | 701/25 |

(Continued)

FOREIGN PATENT DOCUMENTS

DE    102011120991 A1    1/2013

OTHER PUBLICATIONS

German Patent and Trademark Office, Examination Report for corresponding German Patent Application No. 10 2015 204 947.7 dated Feb. 1, 2016.

*Primary Examiner* — Tyler Paige
(74) *Attorney, Agent, or Firm* — Frank A. MacKenzie; Brooks Kushman P.C.

(57) ABSTRACT

A method for operating a motor vehicle when the driver thereof needs to accomplish a series of tasks (such as delivery and/or pick-up of items) along a route that each require the driver to park the motor vehicle, to leave it and to cover certain distances on foot. The motor vehicle is able to operate both under the control of a human driver aboard the motor vehicle or autonomously without driver intervention. When the driver parks the motor vehicle for the purpose of task accomplishment, an electronic plan of the tasks is checked to determine whether it is more efficient for task accomplishment if the driver returns to the motor vehicle at the first parking location or if the vehicle drives autonomously to a next stopping point situated in the direction of travel and the human driver walks to meet it at the next stopping point.

16 Claims, 1 Drawing Sheet

(56) References Cited

U.S. PATENT DOCUMENTS

2015/0006005 A1\* 1/2015 Yu .................... G05D 1/0297
 701/22
2015/0233719 A1\* 8/2015 Cudak .................. B60K 35/00
 701/23

\* cited by examiner

METHOD FOR OPERATING AN AUTONOMOUS VEHICLE ON A COURIER ROUTE

CROSS-REFERENCE TO RELATED APPLICATIONS

This application claims foreign priority benefits under 35 U.S.C. §119(a)-(d) to DE 10 2015 204 947.7 filed Mar. 19, 2015, which is hereby incorporated by reference in its entirety.

TECHNICAL FIELD

The disclosure relates to a method and an apparatus for operating a motor vehicle over a courier route, the vehicle being either manually controllable or capable of autonomous driving.

BACKGROUND

An autonomous motor vehicle that can drive, steer and park entirely without control by a human driver even when the driver's seat remains empty is known. Such an autonomous vehicle can use various sensors to perceive its surroundings and to determine its position and that of other road users from the information obtained, can proceed to a driving destination in cooperation with navigation software, and can avoid collisions.

A motor vehicle is known e.g. in the form of a truck that is capable of driving on freeways and highways largely autonomously behind another truck, traveling in front, while the driver can rest or concern himself with other activities, but can take over control of the vehicle at any time.

In contrast to trucks, the method disclosed herein is best suited for circumstances in which the route along which the driver needs to accomplish tasks (such as delivery and/or pick-up of items, which may be generally referred to a courier services) is a single road or a limited street comprising a plurality of contiguous roads where the driver needs to repeatedly stop, get out and move away from the vehicle to accomplish the tasks. This is typically the case with small transport trucks/vans, as are used by e.g. courier services. The disclosed method can also be used for other motor vehicles, however, that are used as courier/delivery vehicles on local journeys, for example for automobiles as are used for food delivery to homes and/or places of business. The disclosed method is also suitable for other tasks of the driver besides deliveries. Thus, e.g. object security employees frequently use subcompact cars to move from one location to the next.

In this case, "courier" is primarily understood to mean the delivery of items such as e.g. letters, packages, parcels or groceries to private persons or businesses, but is also meant to include pick-up of such items.

Local courier services usually use small transporters (trucks or vans) in order to transport a certain quantity of packages that need to be delivered in particular geographical areas. In order to streamline the delivery, a vehicle is ordinarily responsible for a particular geographical area in which most of the addresses to which the packages need to be delivered are located. This area comprises e.g. multiple roads in the same part of a city. Once he has arrived on one of the roads, the driver generally stops the delivery vehicle at a suitable point on the road, switches off the engine, removes the items to be delivered from the cargo space and walks to the relevant addresses on the road. Once he has delivered the items, the driver returns to the vehicle, starts the engine again, drives on for a short distance and repeats all of this until he has delivered all the items on a road. He then drives to the next road for which he is responsible.

SUMMARY

According to the disclosure, the driver, when parking the motor vehicle for the purpose of task accomplishment, can select a mode of operation in which a stored electronic plan of the tasks of the driver is used to automatically determine whether it would be more efficient for task accomplishment if the motor vehicle were to remain at the parking location or if it were to drive on to a stopping point situated in the direction of travel. In the latter case, the motor vehicle autonomously drives to the next stopping point situated in the direction of travel, and remains there, while the driver completes one or more tasks (such as deliveries) and then walks to meet the vehicle at the next stopping point when done.

In this case, the criterion used to decide what is more efficient for task accomplishment may include the walking route distance that can be expected, according to the task plan, between the location of the last current task accomplishment and the current parking location of the vehicle. Furthermore, it may be checked and taken into account whether there is a suitable stopping point in the direction of travel. Should the local parking or parking prohibition situation not allow the vehicle to follow the driver who is en route or even to drive a short way ahead, the vehicle can remain where it is currently located.

In many cases, the disclosed method can be used to shorten the walking routes of delivery men or the like, and additionally they are saved a little driving time in the vehicle. Furthermore, it is possible to prevent the vehicle from obstructing road traffic for longer than necessary where the driver has parked it because he wishes to take a particularly heavy or bulky shipment to the recipient on the shortest route possible, and the vehicle can drive on to a more efficient stopping point (i.e. closer to the recipient so that walking distance/time is minimized) in the meantime.

The system/method disclosed here is best suited to motor vehicles in road traffic that normally have a human being aboard as the driver and delivery agent and that can be used to carry a relatively large number of mail shipments, including heavy and/or bulky packages.

Furthermore, parking assistance systems for motor vehicles are known that can assist parking or parking exit maneuvers or other steering maneuvers on command or can even perform them completely automatically, namely by dint of autonomous maneuvering, after the driver has left the motor vehicle and has started the steering maneuver e.g. by radio.

In one embodiment, route efficiency criteria used to assess efficiency of task accomplishment include the distances and times that can be expected, according to the task plan, for the driver to walk between stops and addresses of the route, the number and nature of tasks to be accomplished (size and or weight of items to be delivered/picked-up, for example), and the number of addresses that the driver needs to visit on foot for the purpose of task accomplishment.

In one preferred embodiment, such a route efficiency criterion is also whether and where there is at least one possible stopping point (i.e. one having a sufficiently high probability of being available and legal for the vehicle to occupy) on the road in the direction of travel. It is thus possible for e.g. signposted stopping zones or no waiting zones to be identified by automatic road sign recognition or from digital road maps. Furthermore, possible/probable stopping points can be obtained empirically over time, e.g. by virtue of the system remembering where the driver found possibilities for stopping on earlier trips.

In one preferred embodiment, the motor vehicle is a delivery vehicle for shipments that need to be delivered or picked up by the driver, the shipments being classified according to delivery areas such as e.g. roads and delivery addresses such as e.g. house numbers.

The various route efficiency criteria can be used to plan a task route. On said task route, each of the cited stopping points is a particular location at which the vehicle remains until the driver returns to the vehicle and picks up and/or drops off an items at the vehicle and continues on foot, or drives on himself. The driver may possibly also command the vehicle remotely by radio to drive on to another stopping point if he deems it expedient.

The parking of the motor vehicle may comprise stopping the motor vehicle, immobilizing it, e.g. by switching off the engine and/or operating a parking brake, and preventing use by other persons, e.g. by locking the vehicle.

The motor vehicle may be controlled (sometimes autonomously and sometimes by the driver) on the basis of a task plan and on the basis of the needs of the driver. The electronic task plan can be interpreted by appropriate software. The driver can e.g. start the system that is installed in the vehicle and that performs the method according to this disclosure when he leaves the vehicle. The system then attempts to follow the schedule of the task plan in the delivery area by undertaking control (longitudinal and lateral) of the vehicle and driving the vehicle forward along the road. The vehicle may, under appropriate conditions, travel at a relatively low speed (for example, less than 15 km/h).

Expediently, the driver will activate the system on a road on which he needs to perform multiple tasks (pick-ups and/or deliveries of items, for example) at multiple stops/addresses, particularly when he can cover multiple close and successive addresses on foot, regardless of whether he carries multiple packets at once on foot or whether he returns to the vehicle between two successive addresses. The vehicle moves at low speed between addresses on the route and, as much as possible, does not move far away from the driver. In doing this, it may be a little ahead of the driver and remain at a suitable stopping point if the task plan reveals that the driver needs to fetch and/or drop off new packages from/at the vehicle at this location.

Every time the driver fetches one or more packages from the vehicle, the system identifies the delivery addresses of said packages from identifiers on the packages and then looks for the nearest suitable stopping point, which, as far as possible, is chosen such that the driver can return to the vehicle from the last delivery address on the shortest route.

Expediently, the driver has the option of asking the vehicle by radio, even externally, to stop as soon as possible at any time, e.g. because a recipient is not at home and he wishes to take the package to a neighboring address or to load it back onto the vehicle. Moreover, whenever the driver returns to the vehicle waiting at a stopping point, he has the option of deactivating the system again or modifying the task plan, e.g. in order to insert an additional stopping point or in order to remove a stopping point from the plan.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
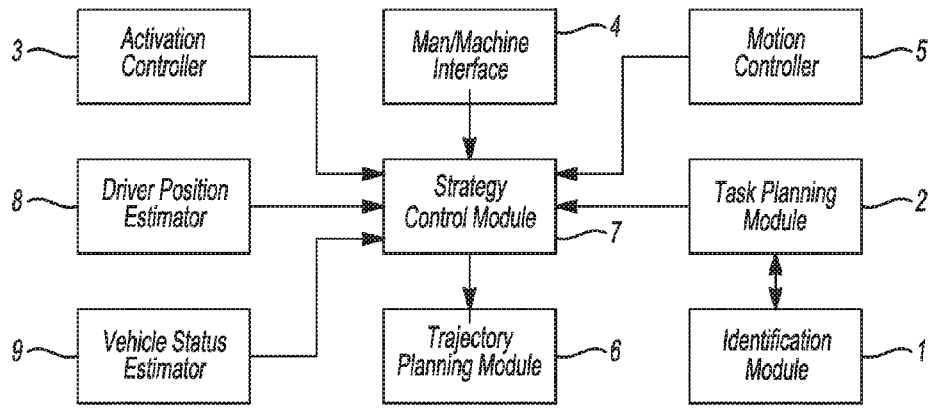
FIG. 1 shows a schematic overview of a system for operating a motor vehicle having autonomous driving capability as a courier vehicle.
Figure 2:
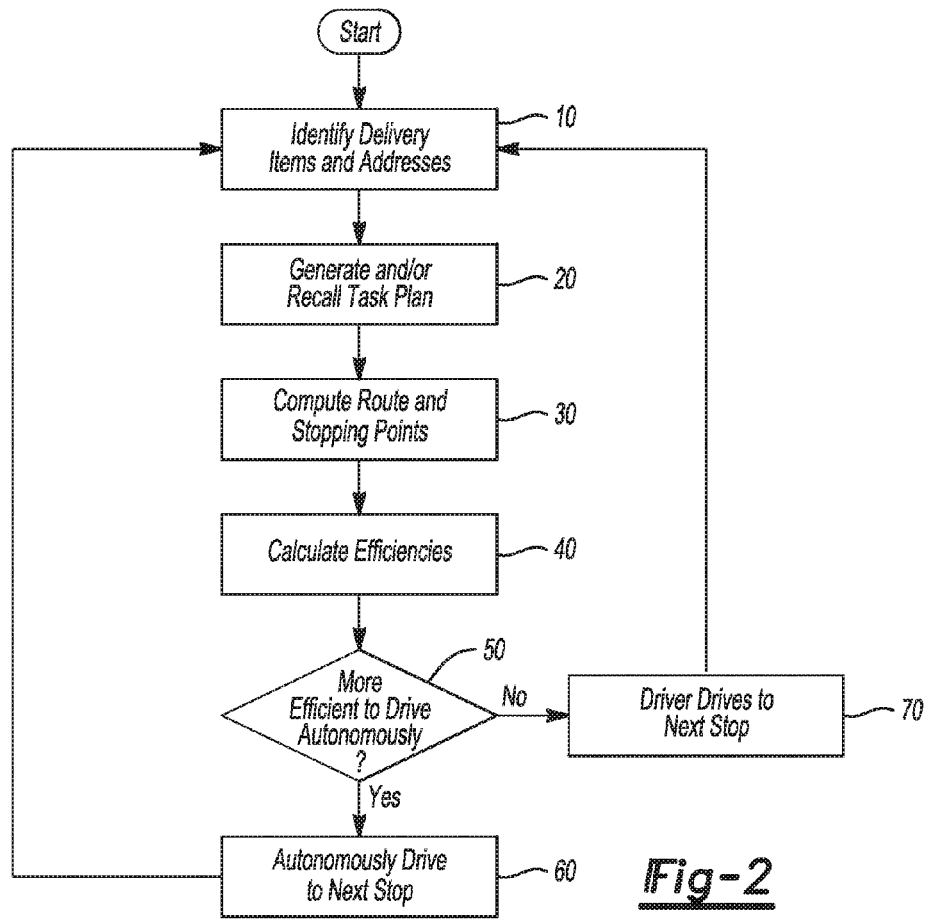
FIG. 2 shows a flowchart of steps of an exemplary method according to the invention.

An identification module 1 identifies all items (letters, packages and the like) that the driver of the delivery vehicle takes from or loads into the vehicle using identifiers on the items. (FIG. 2, Step 10.) This may be accomplished (as is well known in the art) e.g. by means of RFID (transmitter/receiver systems for automatically and contactlessly identifying and locating objects with radio waves), QR codes (optically detectable two-dimensional codes) or Bluetooth stickers. The identification module 1 either ascertains the relevant delivery addresses directly from the identifiers or takes them from an electronically stored task plan.

A task planning module 2 classifies the items to be delivered according to geographical areas, e.g. according to addresses on the same road, and, in cooperation with the identification module 1, computes a route through the various geographical areas and furthermore stopping points at which the driver either fetches further items from the vehicle or gets back into the vehicle in order to drive on to the next stopping point. (FIG. 2, Steps 20, 30.)

The task planning module 2 further calculates route efficiencies (based upon selected efficiency criteria such as are described above) and compares the route efficiencies for the cases where the driver returns to the vehicle after a delivery, or walks to a next delivery address with the vehicle driving autonomously to meet him at a next stopping point (Steps 40-70).

The driver can activate or deactivate the system manually. In the deactivated state, in which autonomous vehicle operation is not possible, an activation controller 3 can operate in the background and notify the driver when the first stopping point on a road has been reached, and can advise him to activate the system and hence to select the mode of operation in which the vehicle drives, possibly autonomously, to the next stopping point situated in the direction of travel.

System activation and deactivation can be effected e.g. using a button on a man/machine interface 4 that the system can also use to provide the driver with the aforementioned notification and with reports about its status and the next steps and that the driver can use to inform the system of any deviations from the task plan. The man/machine interface 4 can be implemented by using image display apparatuses and/or audio systems installed in the vehicle and/or by using a mobile communication apparatus such as e.g. a Smartphone or a Tablet Computer that is carried by the driver.

A vehicle motion controller 5 undertakes longitudinal and if need be lateral control of the vehicle and drives it at a low speed of typically no more than 15 km/h.

A trajectory planning module 6 processes guidelines for the vehicle motion controller 5, particularly the next stopping point in a particular geographical area, the current vehicle position, which can be obtained very precisely e.g.

by fusion of GPS data and wheel sensor data, unexpected obstacles on the roadway, e.g. a vehicle moving out of a parking space onto the planned trajectory, cyclists, pedestrians and other road users, and also unplanned needs of the driver, e.g. after a break.

A strategy control module 7 monitors and coordinates the operation of the system components described above. In particular, it can activate and deactivate the system, plan the next trajectory path by means of the trajectory planning module 6, control the vehicle by means of the vehicle motion controller 5, stop the motion of the vehicle, with e.g. the hazard lights being switched on and the vehicle being immobilized e.g. by means of an electromechanical parking brake, resume the motion of the vehicle, operate an automatic start/stop system of the vehicle to lower fuel consumption and emissions, etc.

The strategy control module 7 can furthermore inform the driver about the status of the system, task progress and the next steps, etc., and it can receive information about task progress and the current task status from the driver or from his mobile communication apparatus and, if need be, have the vehicle remain at a stopping point for longer than previously planned if the current task status so requires.

A driver position estimator 8 is used for estimating the relative position of the driver in relation to the vehicle, e.g. on the basis of the task plan and the time elapsed since the driver went away, and particularly accurately on the basis of position signals sent to the system by a wireless communication device (such as a Smartphone) carried by the driver.

A vehicle status estimator 9 monitors the current status of the task vehicle, e.g. the vehicle position, the traffic in the surroundings, internal errors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a motor vehicle capable of autonomous operation, comprising:
   for a route having a first and a second address requiring accomplishment of respective first and second tasks, calculating, by an electronic control system of the vehicle, respective first and second route efficiencies for 1) autonomously controlling the vehicle by the electronic control system to move the vehicle from a first stop associated with the first address to a second stop associated with the second address after an occupant enters the vehicle, and 2) autonomously controlling the vehicle by the electronic control system to move the vehicle from the first stop to the second stop without the occupant; and
   if the second efficiency is greater than the first efficiency, causing the vehicle to drive autonomously from the first stop to the second stop without the occupant.

2. The method of claim 1, wherein criteria used to calculate the first and second efficiencies comprise walking distances and/or walking times between the first stop, the first address, the second stop, and the second address.

3. The method of claim 1, wherein criteria used to calculate the first and second efficiencies comprise a probability of a parking space being available for the vehicle at the second stop.

4. The method of claim 1, wherein the first and second tasks comprise pick-ups and/or deliveries of items at the respective addresses.

5. The method of claim 4, wherein criteria used to calculate the first and second efficiencies comprise respective weights and/or sizes of items to be delivered and/or picked-up.

6. The method of claim 1, further comprising estimating a position of the occupant relative to the vehicle based on a signal sent to the controller by a wireless communication device carried by the occupant.

7. A method of controlling an autonomous vehicle comprising:
   for a route requiring delivery and/or pick-up of items at multiple addresses, calculating, by a task planning module, respective first and second route times corresponding to 1) leaving the vehicle parked at a first stop until a person returns to the vehicle from a first address before proceeding to a second stop, and 2) moving the vehicle autonomously to the second stop using an activation controller without the person in the vehicle; and
   if the second time is less than the first time, autonomously moving the vehicle to the second stop without the person in the vehicle.

8. The method of claim 7, wherein criteria used to calculate the first and second times comprise foot path distances and/or foot path times between the first stop, the first address, the second stop, and the second address.

9. The method of claim 7, wherein criteria used to calculate the first and second times comprise a probability of a parking space being available for the vehicle at the second stop.

10. The method of claim 7, wherein criteria used to calculate the first and second times comprise respective weights and/or sizes of the items to be delivered and/or picked-up.

11. The method of claim 7, further comprising estimating a position of the person relative to the vehicle based on a signal sent to the vehicle by a wireless communication device carried by the person.

12. A method of operating a vehicle comprising:
   autonomously moving the vehicle by a vehicle controller to a second location in response to a first efficiency, calculated by the controller, of a vehicle passenger proceeding to the second location from an intermediate location without the vehicle being greater than a second calculated efficiency associated with parking the vehicle at a first location until the vehicle passenger returns to the first location from the intermediate location.

13. The method of claim 12, wherein criteria used to calculate the first and second efficiencies comprise walking distances and/or walking times between the intermediate location, the first location, and the second location.

14. The method of claim 12, wherein criteria used to calculate the first and second efficiencies comprise a probability of a parking space being available for the vehicle at the second location.

15. The method of claim 12, wherein criteria used to calculate the first and second efficiencies comprise respective weight and/or size of an item to be delivered to the second location.

16. The method of claim 12, further comprising estimating a position of the passenger relative to the vehicle based on a signal sent to the vehicle controller by a wireless communication device.

* * * * *